(12) United States Patent
Hellberg et al.

(10) Patent No.: US 8,039,518 B2
(45) Date of Patent: Oct. 18, 2011

(54) ENVIRONMENTALLY FRIENDLY WATER/OIL EMULSIONS

(75) Inventors: Per-Erik Hellberg, Svenshogen (SE); Ingemar Uneback, Svenshogen (SE)

(73) Assignee: Akzo Nobel, N.V., Arnhem (NL)

( * ) Notice: Subject to any disclaimer, the term of this patent is extended or adjusted under 35 U.S.C. 154(b) by 363 days.

(21) Appl. No.: 12/294,107

(22) PCT Filed: Apr. 3, 2007

(86) PCT No.: PCT/EP2007/053256
§ 371 (c)(1),
(2), (4) Date: Sep. 23, 2008

(87) PCT Pub. No.: WO2007/115980
PCT Pub. Date: Oct. 18, 2007

(65) Prior Publication Data
US 2009/0209666 A1    Aug. 20, 2009

Related U.S. Application Data

(60) Provisional application No. 60/790,069, filed on Apr. 7, 2006.

(30) Foreign Application Priority Data

Apr. 7, 2006  (EP) ..................... 06112350

(51) Int. Cl.
*B01D 17/05* (2006.01)
*C08F 293/00* (2006.01)

(52) U.S. Cl. ......... 516/185; 510/124; 528/272; 528/275

(58) Field of Classification Search ............. 516/185; 528/272, 275; 510/124, 504
See application file for complete search history.

(56) References Cited

U.S. PATENT DOCUMENTS

| 2,867,667 | A | 1/1959 | Dermer et al. |
| 3,853,060 | A | 12/1974 | Weeding |
| 3,903,006 | A | 9/1975 | Elliott et al. |
| 4,390,417 | A | 6/1983 | Sweeney |
| 5,256,828 | A * | 10/1993 | Cuscurida et al. ............ 568/620 |
| 5,401,439 | A | 3/1995 | Elfers et al. |
| 6,653,395 | B1 * | 11/2003 | Bergstrom et al. ............ 524/599 |
| 2004/0039235 | A1 * | 2/2004 | Bergstrom et al. ............ 568/595 |
| 2004/0198631 | A1 * | 10/2004 | Hellberg ....................... 510/504 |
| 2004/0266973 | A1 | 12/2004 | Strickland et al. |
| 2005/0080221 | A1 | 4/2005 | Meyer |
| 2007/0066492 | A1 * | 3/2007 | Funkhouser et al. ......... 507/261 |

FOREIGN PATENT DOCUMENTS

| EP | 0 909 286 B1 | 8/2001 |
| EP | 1 042 266 B1 | 9/2002 |
| WO | WO 98/00452 | 1/1998 |
| WO | WO 99/32424 | 7/1999 |
| WO | WO 03/018534 A1 | 3/2003 |

OTHER PUBLICATIONS

Hellberg et al. (Noionic Cleavable Ortho Ester Surfactant, AOCS Press, Journal of Surfactants and Detergents, vol. 3, No. 3 (Jul. 2000), 369-379).*
International Search Report for International Application No. PCT/EP2007/053256, Jul. 16, 2007.
Balson, "Something Old, Something New: A Discussion About Demulsifiers," Chemistry in the Oil Industry VIII Symposium, Nov. 3-5, 2003, pp. 226-238 (esp. pp. 232-236).

* cited by examiner

*Primary Examiner* — Ling Choi
*Assistant Examiner* — Chun-Cheng Wang
(74) *Attorney, Agent, or Firm* — Norris McLaughlin & Marcus P.A.; Mark D. Marin

(57) ABSTRACT

The invention relates to particular orthoester based polymers as well as the use of specific orthoester beased polymers as a demulsifier for water/oil emulsions.

16 Claims, No Drawings

ENVIRONMENTALLY FRIENDLY WATER/OIL EMULSIONS

The present invention relates to an orthoester based polymer used for breaking water-in-oil emulsions and a method for the preparation of these compounds. More in particular, this invention relates to said polymers as demulsifiers (=emulsion breakers) for water in crude oil emulsions and in a fermentation process. Some of these compounds have not been described before.

BACKGROUND OF THE INVENTION

Crude oil produced from geological formations can contain various amounts of water. The water contents normally vary both between production wells and during the lifetime of one and the same production well. Water and crude oil are immiscible by nature and are normally in different phases in an oil-containing geological formation. However, as oil is produced, it is inevitable that at the same time water is also produced. As the crude oil and water are transported through production tubing and equipment, they are subject to significant mixing energy, especially at points of pressure release. This mixing energy together with naturally occurring emulsifying compounds in the crude oil can create quite persistent emulsions. The nature of these emulsions can vary widely depending on the composition of the crude oil, the production method, etc.

For economical and logistics reasons as well as demands from downstream operations (refineries, etc.) it is very important to separate water from the produced oil as rapidly and completely as possible already at the production site. This separation is severely hampered by the above-mentioned emulsification prior to the separation stage. Traditionally, both physical and chemical methods have been utilized to quickly break these emulsions in the separation equipment.

In a large majority of cases, the addition of organic chemicals ("demulsifiers") is used either as the single method or in combination with physical methods. Demulsifiers can be used as a single compound, but due to the great variation in the nature of the water-in-crude oil emulsions, blends of demulsifiers are commonly utilized to achieve the highest possible technical efficiency in each single case.

Types of demulsifiers commonly used include mainly nonionic ethylene oxide/propylene oxide block polymers (polyglycols), alkylphenol-formaldehyde resin alkoxylates, and epoxy resin-based alkoxylates. (See "Something Old, Something New: A Discussion about Demulsifiers", T. G. Balson, pp. 226-238, esp. pp 232-236 in *Proceedings of the Chemistry in the Oil Industry VIII Symposium*", 3-5 Nov. 2003, Manchester, UK, published by The Royal Society of Chemistry, UK).

Some examples of patent publications relating to demulsifiers follow below.

U.S. Pat. No. 3,835,060 teaches that conventional demulsifiers include, e.g., polyoxyalkylene glycol and block polymers of polyoxyethylene-polyoxypropylene.

U.S. Pat. No. 5,401,439 discloses oil demulsifiers containing an alkoxylate of an alkylphenol-formaldehyde resin, an alcohol, a bisphenol or an amine, wherein the alkoxylate has a polydispersity of at least 1.7.

US 2004/0266973-A1 describes the use of an alkoxylated alkylphenol-arylaldehyde polymer for resolving water-in-oil emulsions, especially emulsions of water in crude oil, and US 2005/0080221-A1 describes the use of an alkoxylated alkylphenol-formaldehyde-diamine polymer for the same purpose.

U.S. Pat. No. 3,903,006 discloses a hydraulic pressure transmission fluid consisting of, or comprising, a synthetic orthoester. The orthoester is either the hydraulic pressure transmission fluid itself or, present in only minor amounts, as a water scavenger; i.e. it will remove minor amounts of water (moisture) present in the hydraulic fluid by participating in a chemical reaction with the water.

For a number of years there has been strong pressure for the use of more environmentally adapted chemicals in various application areas. This is also the case for oilfield production chemicals including demulsifiers, especially as regards their use in off-shore oil production. The presently used demulsifiers are for the most part biologically persistent, i.e. they exhibit a very poor biodegradability. Thus, there is a great need for new demulsifiers with an acceptable biodegradation profile combined with a low ecotoxicity and an excellent technical performance.

Thus, the aim of the present invention is to provide new efficient demulsifiers for breaking water-in-oil emulsions. In addition, said demulsifiers should also have an improved biodegradability profile compared to previously mentioned standard types of demulsifiers and exhibit a low ecotoxicity.

Now it has surprisingly been found that an orthoester based polymer having the general formula

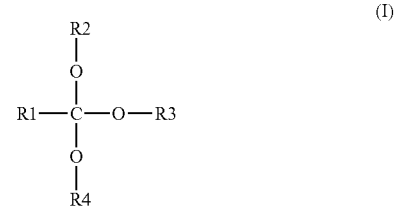

wherein R1 is hydrogen or a hydrocarbyl group with 1-4 carbon atoms, R2, R3, and R4 are, independently, a group comprising $C_3$-$C_4$, preferably $C_3$, alkyleneoxy groups and/or ethyleneoxy groups in any order, preferably in blocks, preferably with both ethyleneoxy groups and $C_3$-$C_4$ alkyleneoxy groups being present, and an end group Y, which is, independently, hydrogen, a hydrocarbyl group with 1-30, preferably 1-8, more preferably 1-6, and most preferably 1-4 carbon atoms, a group —$(CH_2)_z$NR5R6 or —$(CH_2)_z$N$^+$R5R6R7, wherein each of R5, R6, and R7 is, independently, an alkyl group with 1-22 carbon atoms or —$CH_2CH_2OH$, and z is 2 or 3; the end group Y preferably being H or a hydrocarbyl group, provided that at least one of the groups R2, R3, and R4 comprises at least one block of at least on average 4 alkyleneoxy groups with 3 and/or 4 carbon atoms, and provided that if Y is hydrogen, then at least one ethyleneoxy or alkyleneoxy group is connected to Y; or a di- or polycondensate of the polymer via free hydroxyl groups in R2, R3 or R4, is an excellent demulsifier for water/oil emulsions, and at the same time has a better biodegradability than the prior art compounds.

In one embodiment R1 is hydrogen or a hydrocarbyl group with 1-4 carbon atoms, R2, R3, and R4 are, independently, a group -$(A)_n(CH_2CH_2O)_m$Y or —$(CH_2CH_2O)_m(A)_n$Y, wherein each A is, independently, an alkyleneoxy group with 3-4, preferably 3, carbon atoms, n and m are, on average and independently, a number of 0-100, preferably 1-100, more preferably 2-100, even more preferably 3-100, still more preferably 5-100, and most preferably 10-100, provided that at least one of the groups R2, R3, and R4 comprises at least one block of at least on average 4 alkyleneoxy groups with 3 and/or 4 carbon atoms, and each Y is, independently, hydrogen, a hydrocarbyl group with 1-30, preferably 1-8, more preferably 1-6, and most preferably 1-4 carbon atoms, a group —$(CH_2)_z$NR5R6 or —$(CH_2)_z$N+R5R6R7, wherein each of R5, R6, and R7 is, independently, an alkyl group with 1-22 carbon atoms or —$CH_2CH_2OH$, and z is 2 or 3; Y preferably is hydrogen or a hydrocarbyl group; provided that if Y is hydrogen, then at least one of n and m is a number of 1-100, or a di- or polycondensate of the polymer via free hydroxyl groups in R2, R3 or R4.

In another embodiment, the sum of all n in the polymer is 10-1200 and at least one of the groups R2, R3, and R4 comprises at least one block with 6-20 alkyleneoxy groups with 3-4 carbon atoms. The blocks containing alkyleneoxy groups with 4 carbon atoms can be made using either butylene oxide, in which case the blocks consist of branched alkyleneoxy groups, or polytetrahydrofuran, wherein the alkyleneoxy groups are linear. The blocks $(A)_n$ and $(CH_2CH_2O)_m$ can be added in any order, but preferably the $(A)_n$ block is closer to the orthoester bond than the $(CH_2CH_2O)_m$ block.

In still another embodiment, the orthoester based polymer for use as a demulsifier for water/oil emulsions is a product wherein R1 is hydrogen, $(A)_n$ is a block $(CH_2CH_2CH_2CH_2O)_n$, Y is hydrogen, and m is at least 3; preferably, the ortho ester is a di- or polycondensate of the polymer via free hydroxyl groups in R2, R3 and R4.

The amount of ethyleneoxy groups in the orthoester based polymer preferably is 40-85%, more preferably 50-75%, by weight of the total molecular weight.

As a consequence of the synthesis route, each product manufactured will be a mixture of a lot of molecular species. This results in a very broad span of molecular weights, with the lowest weights being around 600, more preferably around 1,000, and the highest molecular weights being around 100,000.

The weight average molecular weight ($M_w$) of the polymer preferably is at least 1,500, more preferably at least 2,000, and at most 40,000, more preferably at most 30,000.

In one further embodiment, the orthoester based polymer for use as a demulsifier for water/oil emulsions is a product wherein R1 is hydrogen, A is an alkyleneoxy group with 3 carbon atoms, and Y is hydrogen, and wherein the amount of ethyleneoxy groups is 50-75% by weight of the total molecular weight, the molecular weight span is 1,000-100,000, and the weight average molecular weight ($M_w$) is 2,000-30,000.

The orthoester polymers (I) can be produced by reacting an orthoester of the general formula

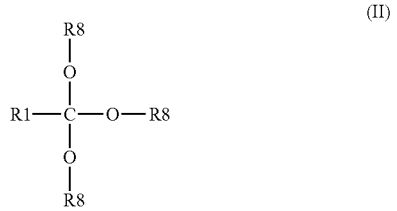

(II)

wherein R1 has the same meaning as above and R8 is a hydrocarbyl group with 1-4 carbon atoms, in one or several steps, with reactants comprising $C_3$-$C_4$, preferably $C_3$, alkyleneoxy groups and/or ethyleneoxy groups in any order, preferably in blocks, an end group Y, which is H or a hydrocarbyl group with 1-30 carbon atoms, and one hydroxyl group at the other end of the molecule, herein denoted as reactants having the formula $HO(A)_n(CH_2CH_2O)_mY$, and/or R5R6N$(CH_2)_z$OH or R5R6R7N+$(CH_2)_z$OH, wherein the symbols n, m, Y, z, R5, R6, and R7 have the same meaning as above. The reaction is performed under removal, preferably by evaporation, of liberated hydroxyl-containing compounds of the formula R8OH. As regards products (I) comprising the group —$(CH_2)_z$N+R5R6R7, these are preferably made by quaternizing an orthoester product comprising the group —$(CH_2)_z$NR5R6 with an alkylating agent R7-X, wherein R7 is a $C_1$-$C_4$ alkyl group and X is any conventional source for an anion of a quaternary ammonium compound, such as a halogen atom or $OSO_3CH_3$.

Because of the method used to produce the orthoester polymers, it should be realized that formula (I) only represents an average orthoester molecule and that specific individual species may have a structure deviating from formula I. For each starting orthoester molecule there are three positions that can be substituted by the reactants. If, e.g., 2 moles of $HO(A)_n(CH_2CH_2O)_mY$ and 1 mole of R5R6N$(CH_2)_z$OH are added to the starting orthoester, this will result in some molecules wherein one of the R8 groups is replaced by -$(A)_n$$(CH_2CH_2O)_m$Y and two of the R8 groups are replaced by —$(CH_2)_z$NR5R6, some molecules wherein two of the R8 groups are replaced by -$(A)_n(CH_2CH_2O)_m$Y and one of the R8 groups is replaced by —$(CH_2)_z$NR5R6, some molecules wherein all three groups R8 are replaced by -$(A)_n(CH_2CH_2O)_m$Y, and some molecules wherein all three groups R8 are replaced by —$(CH_2)_z$NR5R6. The product resulting from the reaction described above thus is a mixture of several components, but the average molecule will be an orthoester wherein two of the groups R8 have been replaced by -$(A)_n(CH_2CH_2O)_m$Y and one of the groups R8 has been replaced by —$(CH_2)_z$NR5R6.

The above method has been described in detail in the patent publications EP-B 909 286, EP-B 1 042 266, and WO 03/018534. It is noted that the products of the present invention differ from the products described in the last publication in that the former must contain at least one block of at least on average 4 alkyleneoxy groups with 3 and/or 4 carbon atoms.

However, when an orthoester compound contains free hydroxyl groups, i.e. when Y is H, then several orthoester molecules may condensate into polymeric structures having higher molecular weights. In formula (I) the average individual orthoester compound is displayed, but formula (I) also symbolizes the polymeric structures that may result from the condensation of several orthoester molecules having free hydroxyl groups. An example of such a polymeric structure is shown below. Here five orthoester molecules have reacted together to form a polycondensate via free hydroxyl groups of the individual orthoester molecules. To obtain this structure, an orthoester of formula II can be reacted with a polypropylene glycol (PPG) and an alcohol ethoxylate of the formula RO$(CH_2CH_2O)_m$H, wherein R is a hydrocarbyl group having 1-30 carbon atoms. The resulting polymer (III) can react further with more orthoester molecules, since there is still one terminal hydroxyl group left in the molecule. The symbols R1, R8, m, and n have the same meaning as stated above.

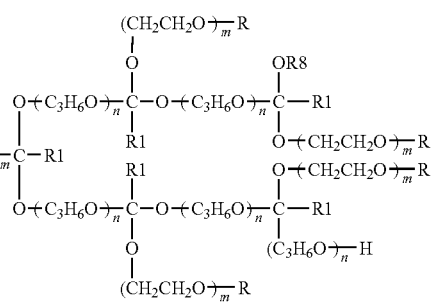

(III)

From the above it is evident that when an orthoester (II) is reacted with compounds having two hydroxyl groups, such as PPG or PEG, then two orthoester molecules of formula (II) may react with the same PPG or PEG molecule, and consequently the ratios between (II) and PPG or PEG can be varied within a wide range to yield products having widely different molecular weights. Further, it is possible to stop the reaction at a certain degree of condensation by discontinuing the heating and removal of R8OH, followed by neutralization of the acid catalyst.

Another possible route to obtaining products of formula (I) wherein Y is H and n and m are 1-100 is to react an orthoester of general formula (II) with a reactant having the formula $HO(A)_nY$, wherein Y is hydrogen, and then to react the obtained intermediate with Σm moles of ethylene oxide. The latter reaction is preferably catalyzed by alkaline catalysts, preferably an alkali metal hydroxide such as NaOH or KOH, or an alkali metal alkoxide such as $NaOCH_3$ or $KOCH_3$. Since the orthoester will rearrange under acid conditions, the use of an acid catalyst is less preferred for the ethoxylation step. The ethoxylation reaction is performed in a manner which is well known in the art. It is also possible to react an orthoester of formula (II) with a reactant $HO(CH_2CH_2O)_mY$, wherein Y is hydrogen, and then react the obtained intermediate with Σn moles of an alkylene oxide having 3-4 carbon atoms using alkaline catalysis. Also the conditions for performing such an alkoxylation reaction are well known to the man skilled in the art.

Wherever the degree of alkoxylation is discussed, the numbers referred to are molar average numbers. Consequently, all numbers m and n referred to above and henceforth, as well as the numbers o and p referred to below, are molar average numbers.

The ethoxylation of orthoesters not containing any hydroxyl groups has been disclosed in U.S. Pat. No. 2,867,667. In this method boron trifluoride is used as a catalyst, and the reaction is performed in the neighborhood of 0° C. or lower due to the sensitivity of the orthoester to the catalyst at higher temperatures.

Some of the orthoester based polymers are new, and the invention also relates to these compounds per se.

Thus the invention relates to an orthoester based polymer according to formula (I), wherein R1 is hydrogen or a hydrocarbyl group with 1-4 carbon atoms, R2 is a group comprising $C_3$-$C_4$, preferably $C_3$, alkyleneoxy groups and/or ethyleneoxy groups in any order, preferably in blocks, and an end group Y, which is H or a hydrocarbyl group with 1-4 carbon atoms, R4 is a group $-(A)_o(CH_2CH_2O)_pZ$ or $-(CH_2CH_2O)_p(A)_oZ$, wherein Z is a hydrocarbyl group with 5-30 carbon atoms, each A is, independently, an alkyleneoxy group with 3-4 carbon atoms, o is a number of 0-100, preferably 0-5, and p is on average a number of at least 1, preferably of at least 5, and of at most 100, preferably of at most 20, or a group $-(CH_2)_zNR5R6$ or $-(CH_2)_zN^+R5R6R7$, wherein R5, R6, and R7 are, independently, an alkyl group with 1-22 carbon atoms or $-CH_2CH_2OH$ and z is 2 or 3, and R3 is selected from the group R2, R4, and a hydrocarbyl group with 1-4 carbon atoms, and provided that at least one of the groups R2, R3, and R4 comprises at least one block of at least 4 alkyleneoxy groups with 3 and/or 4 carbon atoms, or a di- or polycondensate of the polymer via free hydroxyl groups in R2 or R3.

A method for producing a polymer or polymer mixture as defined above comprising one or several steps is performed by reacting an orthoester having general formula (II), wherein R1 has the same meaning as above and R8 is a hydrocarbyl group with 1 to 4 carbon atoms, with reactants comprising $C_3$-$C_4$, preferably $C_3$, alkyleneoxy groups and/or ethyleneoxy groups in any order, preferably in blocks, an end group Y, which is H or a hydrocarbyl group with 1-4 carbon atoms, and one hydroxyl group at the other end of the molecule, $HO(A)_o(CH_2CH_2O)_pZ$, $HO(CH_2CH_2O)_p(A)_oZ$, wherein A, 0, p, and Z have the same meaning as above, and $R5R6N(CH_2)_zOH$ or $R5R6R7N^+(CH_2)_zOH$, wherein the symbols z, R5, R6, and R7 have the same meaning as above, under removal of liberated hydroxyl-containing compounds of the formula R8OH, or alternatively, to obtain an orthoester based polymer wherein R4 is a group $-(CH_2)_zN^+R5R6R7$, by quaternizing an orthoester based polymer wherein R4 is $-(CH_2)_zNR5R6$ with an alkylating agent R7X, wherein R7 is a $C_1$-$C_4$ alkyl group and X is a conventional source for an anion of a quaternary ammonium compound, such as a halogen atom or $OSO_3CH_3$.

More specifically, the invention relates to an orthoester based polymer according to formula (I), wherein R1 is hydrogen or a hydrocarbyl group with 1-4 carbon atoms, R2 is a group $-(A)_n(CH_2CH_2O)_mY$ or $-(CH_2CH_2O)_m(A)_nY$, wherein each A is an alkyleneoxy group with 3-4 carbon atoms, n and m are, on average and independently, a number of 0-100, Y is H or a hydrocarbyl group with 1-4 carbon atoms, provided that if Y is hydrogen, then at least one of n or m in the same substituent as said Y is a number of 1-100 for that group, R4 is a group $-(A)_o(CH_2CH_2O)_pZ$ or $-(CH_2CH_2O)_p(A)_oZ$, wherein Z is a hydrocarbyl group with 5-30 carbon atoms, o is a number of 0-100, preferably 0-5, and p is on average a number of at least 1, preferably of at least 5, and of at most 100, preferably of at most 20, or a group $-(CH_2)_zNR5R6$ or $-(CH_2)_zN^+R5R6R7$, wherein R5, R6, and R7 are, independently, an alkyl group with 1-22 carbon atoms or $CH_2CH_2OH$ and z is 2 or 3, and R3 is selected from the group R2, R4, and a hydrocarbyl group with 1-4 carbon atoms, and provided that at least one of the groups R2, R3, and R4 comprises at least one block of at least 4 alkyleneoxy groups with 3 and/or 4 carbon atoms, or a di- or polycondensate of the polymer via free hydroxyl groups in R2 or R3.

A method for producing a polymer or polymer mixture as defined above comprising one or several steps is performed by reacting an orthoester having the general formula (II), wherein $R_1$ has the same meaning as above and R8 is a hydrocarbyl group with 1 to 4 carbon atoms, with reactants selected from the group having the formulae $HO(A)_n(CH_2CH_2O)_mY$, $HO(CH_2CH_2O)_m(A)_nY$, wherein A, n, m, and Y have the same meaning as above, $HO(A)_o(CH_2CH_2O)_pZ$ or $HO(CH_2CH_2O)_p(A)_oZ$, wherein A, o, p, and Z have the same meaning as above, and $R5R6N(CH_2)_zOH$ or $R5R6R7N^+(CH_2)_zOH$, wherein the symbols z, R5, R6, and R7 have the same meaning as above, under removal of liberated hydroxyl-containing compounds of the formula R8OH, or alternatively, to obtain an orthoester based polymer wherein R4 is a group $-(CH_2)_zN^+R5R6R7$, by quaternizing an orthoester based polymer wherein R4 is $-(CH_2)_zNR5R6$ with an alkylating agent R7X, wherein R7 is a C1-C4 alkyl group and X is a conventional source for an anion of a quaternary ammonium compound, such as a halogen atom or $OSO_3CH_3$.

One of the preferred new products of the invention is an orthoester based polymer according to formula (I), wherein R1 is hydrogen or a hydrocarbyl group with 1-4 carbon atoms, R2 is a group $-(A)_n(CH_2CH_2O)_mY$ or $-(CH_2CH_2O)_m(A)_nY$, wherein each A is an alkyleneoxy group with 3-4 carbon atoms, n and m are a number of 0-100, Y is H or a hydrocarbyl group with 1-4 carbon atoms, provided that if Y is hydrogen, then at least one of n or m in the same substituent as said Y is a number of 1-100 for that group, R4 is a group -(A)$_o$(CH$_2$CH$_2$O)$_p$Z or —(CH$_2$CH$_2$O)$_p$(A)$_o$Z, wherein Z is a hydrocarbyl group with 5-30 carbon atoms, o is on average a number of 0-100, preferably 0-5, and p is on average a number of at least 1, preferably of at least 5, and of at most 100, preferably of at most 20, and R3 is selected from the group R2, R4, and a hydrocarbyl group with 1-4 carbon atoms, and provided that at least one of the groups R2, R3, and R4 comprises at least one block of at least 4 alkyleneoxy groups with 3 and/or 4 carbon atoms, or a di- or polycondensate of the polymer via free hydroxyl groups in R2 or R3.

A method for producing a polymer or polymer mixture as defined for the preferred product above, comprising one or several steps, is performed by reacting an orthoester having general formula (II), wherein R1 has the same meaning as stated earlier and R8 is a hydrocarbyl group with 1 to 4 carbon atoms, with reactants having the formulae HO(A)$_n$(CH$_2$CH$_2$O)$_m$Y or HO(CH$_2$CH$_2$O)$_m$(A)$_n$Y and HO(A)$_o$(CH$_2$CH$_2$O)$_p$Z or HO(CH$_2$CH$_2$O)$_p$(A)$_o$Z, wherein A, n, m, Y, o, p, and Z have the same meaning as above, under removal, preferably by evaporation, of liberated hydroxyl-containing compounds of the formula R8OH.

Another preferred new product of the invention is an orthoester based polymer according to formula (I), wherein R1 is hydrogen or a hydrocarbyl group with 1-4 carbon atoms, R2 is a group -(A)$_n$(CH$_2$CH$_2$O)$_m$Y or —(CH$_2$CH$_2$O)$_m$(A)$_n$Y, wherein each A is an alkyleneoxy group with 3-4 carbon atoms, n and m are a number of 0-100, Y is H or a hydrocarbyl group with 1-4 carbon atoms, provided that when Y is hydrogen, at least one of n or m is a number of 1-100 for that group, R4 is a group —(CH$_2$)$_z$NR5R6 or —(CH$_2$)$_z$N$^+$R5R6R7, wherein R5, R6, and R7 are, independently, an alkyl group with 1-22 carbon atoms or —CH$_2$CH$_2$OH and z is 2 or 3, and R3 is selected from the group R2, R4, and a hydrocarbyl group with 1-4 carbon atoms, and provided that at least one of the groups R2, R3, and R4 comprises at least one block of at least 4 alkyleneoxy groups with 3 and/or 4 carbon atoms, or a di- or polycondensate of the polymer via free hydroxyl groups in R2 or R3.

A method for producing a polymer or polymer mixture as defined for the preferred product above, comprising one or several steps, is performed by reacting an orthoester having general formula (II), wherein R1 has the same meaning as stated earlier and R8 is a hydrocarbyl group with 1 to 4 carbon atoms, with reactants having the formulae R5R6N(CH$_2$)$_z$OH or R5R6R7N$^+$(CH$_2$)$_z$OH and HO(A)$_n$(CH$_2$CH$_2$O)$_m$Y or HO(CH$_2$CH$_2$O)$_m$(A)$_n$Y, wherein the symbols n, m, Y, z, R5, R6, and R7 have the same meaning as above, under removal, preferably by evaporation, of liberated hydroxyl-containing compounds of the formula R8OH, or alternatively, to obtain an orthoester based polymer wherein R4 is a group —(CH$_2$)$_z$N$^+$R5R6R7, preferably an orthoester polymer wherein R4 is —(CH$_2$)$_z$NR5R6 is quaternized by an alkylating agent R7X, wherein R7 is a C$_1$-C$_4$ alkyl group and X is a halogen atom or OSO$_3$CH$_3$, preferably a halogen atom. The most preferred alkylating agents are methyl chloride and dimethyl sulfate.

Suitable starting materials HO(A)$_n$(CH$_2$CH$_2$O)$_m$Y, wherein Y is H, are polyethylene glycols (PEG), polypropylene glycols (PPG), polybutylene glycols, polytetrahydrofurans, block or random copolymers of ethylene oxide and propylene oxide, or of ethylene oxide and butylene oxide, and ethoxylated polytetrahydrofurans. Suitable starting materials wherein Y is an alkyl group are poly(ethylene glycol) monomethyl ether, poly(ethylene glycol) monoethyl ether, poly(ethylene glycol) monopropyl ether, poly(ethylene glycol) monobutyl ether, diethylene glycol monobutyl ether, and ethoxylated alcohols, such as ethoxylated n-hexanol, n-octanol, 2-ethylhexanol, nonanol, n-decyl alcohol, 2-propylheptanol, n-dodecyl alcohol, tridecyl alcohol, C$_{10}$-C$_{12}$-alkyl alcohol, C$_9$-C$_{11}$-alkyl alcohol, or C$_{16}$-C$_{18}$-alkyl alcohol. Suitable starting materials wherein Y is a group —(CH$_2$)$_z$NR5R6 are 2-(dimethylamino)ethanol, 3-dimethylamino-1-propanol, 2-(diethylamino)ethanol, 3-diethylamino-1-propanol, 2-(diisopropylamino)ethanol, 2-(dibutylamino)ethanol, and primary alkylamines ethoxylated with two moles of ethylene oxide (EO), such as n-hexyl amine+2EO, 2-ethylhexyl amine+2EO, 2-propylheptyl amine+2EO, n-decyl amine+2EO, n-dodecyl amine+2EO, (coco alkyl)amine+2EO, n-tetradecyl amine+2EO, n-hexadecyl amine+2EO, n-octadecyl amine+2EO, oleyl amine+2EO, (tallow alkyl)amine+2EO, (rape seed alkyl)amine+2EO, (soya alkyl)amine+2EO, and erucyl amine+2EO.

The orthoester polymer can be used as a demulsifier for separating water/oil emulsions in the production of oil. The polymer can also be used as a demulsifier in a fermentation process, e.g. in the production of penicillin. In this production process an extraction is performed which gives rise to a persistent o/w emulsion, which breaks when the demulsifiers according to the present invention are added. The demulsifiers according to the invention may be used in any process where a water/oil emulsion is formed, and their use is not restricted to the applications mentioned above, By the term water/oil emulsion is meant here any emulsion between water and oil, i.e. both w/o and o/w are included. It is noted that the water/oil emulsions that are demulsified are not hydraulic pressure transmission fluids.

The demulsifier can be combined with solvents and other chemicals typically used in these applications, and consequently it can be used either as such or in a formulation. The amount of water present in the w/o emulsion to be demulsified may range from 0.5 to 98%, based on the total amount of w/o emulsion. Preferably, at least 1% water is present in the emulsion, more preferably at least 2%, even more preferably at least 3%, still more preferably at least 4%, and most preferably at least 5% is present.

A common way to characterize demulsifiers is by their relative solubility number (RSN value). The test is carried out by dissolving a specific amount of demulsifier in a defined volume of an organic solvent mixture and then titrating this solution with water. Once a certain volume of water has been added, the solution will turn from clear (transparent) to cloudy. The water volume (in mL) at which this change takes place is the RSN value. Ordinarily, more hydrophilic (water-soluble) demulsifiers have a higher RSN value than more hydrophobic (oil-soluble) ones. For a very large majority of commercially used demulsifiers, the RSN value found is in the range of 5-25. For the specific solvent mixture and test conditions used to characterize the products of the present invention, see the experimental section.

The composition of crude oils (and production water) can differ considerably between different wells and even, with time, for the same well. This means that the composition of demulsifiers has to be especially adapted for each well and stage of production to give a good performance. The demulsifiers should fulfill four main performance criteria, rapid separation of the oil-and-water phase, creation of a distinct interface, giving low residual water contents in the separated oil phase, and giving a good quality of the separated water phase. The last demand is important in order to minimize pollution by discharged water and/or the need for further water treatment before discharge. To a person skilled in surface chemistry, it will be obvious that it is very difficult to find single molecules that fulfill all four of these demands. For this reason blends of demulsifiers are very commonly used in practice to get optimal results. Often demulsifiers with both comparatively high and comparatively low RSN values are used in the optimized blend. Thus, it is very valuable if the same type of basic chemistry can be utilized to produce demulsifiers with both high and low RSN values. It is demonstrated in the examples that a wide variety of RSN values can be achieved with the types of compounds of the present invention.

When used for separation of the water/oil emulsions that result from a process for the production of oil, an orthoester polymer demulsifier according to the present invention may be applied at the well head, at a suitable injection point downstream, or at any stage of crude oil processing. A suitable amount of orthoester polymer added to the oil or emulsion can for example be from 1 to 500 mg/kg (mg/kg=ppm by weight, ppmw), normally from 1 to 50 mg/kg, calculated on the amount of water and oil. The exact amount of demulsifier is dependent on the type of oil, some oils requiring more and others requiring less demulsifier. Mixtures of demulsifiers according to the invention can be used, but also one or more demulsifiers according to the invention can be used together with one or more conventional demulsifiers. For other applications, such as for breaking emulsions arising in fermentation processes, larger amounts of demulsifier may be needed, e.g. up to 0.5% based on the total amount of broth.

The present invention is further illustrated by the following examples.

GENERAL EXPERIMENTAL

Different orthoester polymers according to the present invention were synthesized in Examples 1-10. The demulsifiers were characterized using the following RSN method.

RSN Method

All steps in the following test are conducted at room temperature.

5.5 g of toluene are weighed into a volumetric flask and tetrahydrofuran (THF) is added to the 250 ml mark of the flask. 1.00 g of demulsifier sample is weighed into a glass flask to the nearest 0.01 g. 30 ml of the THF/toluene solution is added to the flask with stirring.

Once the demulsifier sample has dissolved completely to an optically clear solution, the solution is titrated with distilled water until the sample becomes hazy or cloudy (by ocular inspection) and does not clear with swirling of the flask for approximately 1 minute. The added water volume in milliliters then equals the RSN value of the demulsifier.

Very similar methods using somewhat different solvents have been published in the open literature, and the RSN values of these normally do not deviate significantly from the ones obtained here.

Molecular Weight Determination

The molecular weights and/or molecular weight ranges given in the examples below were determined by the following method:

For separation, a SEC (Size Exclusion Chromatography) column was used. This means that porous particles are used to separate molecules of different sizes, and the molecules with the largest space-filling volume (more strictly, hydrodynamic radius) have the shortest retention times.

Pure poly(propylene glycols) with different chain lengths were used as standards. Since these are straight-chain molecules and the products of the present invention are more or less branched, these are not ideal for use in SEC-analysis, but they are still considered to be the best available standards, since poly(propylene glycol) is an essential ingredient in the products of Examples 1-7.

It is thus to be understood that the given molecular weights and molecular weight ranges only are indicative of the true values and that the retention times upon which the given molecular weights/molecular weight ranges are based depend not only on the true molecular weight but also on the degree of branching and other parameters.

In the examples below, all molecular weights are given as weight averages ($M_w$).

The starting materials used to produce the orthoester based polymers in the following examples are either commercially available or can be synthesized by standard procedures well known in the art.

Example 1

Synthesis of Product 1a

Step 1

One mole of triethyl orthoformate (TEOF), 1.3 moles of polypropylene glycol having an average molecular weight of 400 (PPG 400), and 0.08% w/w (on total weight of charged mixture) of anhydrous citric acid were mixed together at ambient temperature. The mixture was heated rapidly to 125° C. and then gradually up to 160° C. during four hours. The gradual increase of the pot temperature was adjusted so that the distillation (top) temperature did not at any stage exceed +78° C., thus ensuring that no TEOF co-distilled with the ethanol was released during the reaction. In the following stage, vacuum was applied to further enhance the removal of ethanol, thereby driving the reaction to completion.

The formation of a PPG-polymer with built-in orthoester links was followed by $^1$H-NMR, which enabled quenching of the reaction at the desired degree of polymerization.

$^1$H-NMR analysis of the final product indicated that 35% of the orthoester links were connected to three PPG-moieties, 46% to two, and 19% to one moiety. No unreacted TEOF was found according to $^1$H-NMR. SEC chromatography showed a broad molecular weight distribution with an average $M_w$ of 3,300.

Step 2

In the subsequent step, the PPG-orthoester polymer was reacted with ethylene oxide in such an amount that around 56% w/w of the final product was made up of ethyleneoxy groups. The reaction was catalyzed with c. 0.5% KOH in methanol. Care was taken to evaporate methanol and liberated water by vacuum at 70° C. for 2 hours before any ethylene oxide was fed into the reactor. The ethoxylation step was carried out at 160° C. and 4.5 bar absolute.

According to $^1$H-NMR analysis, the orthoester links connecting the polymer blocks were not disrupted during ethoxylation.

The RSN value was found to be 21.2.

Additional products were subsequently synthesized by reacting the PPG-polymer obtained in step 1 with different amounts of ethylene oxide by the same procedure as described above. These products were characterized as follows:

|  | % by weight of ethyleneoxy groups | RSN |
| --- | --- | --- |
| Product 1b) | 34 | 15.2 |
| Product 1c) | 42 | 17.1 |
| Product 1d) | 47 | 18.7 |
| Product 1e) | 52 | 20.2 |
| Product 1f) | 63 | 22.0 |

Example 2

Step 1

One mole of triethyl orthoformate (TEOF), 0.85 moles of polypropylene glycol having an average molecular weight of 400 (PPG 400), and 0.08% w/w (on total weight of charged mixture) of anhydrous citric acid were mixed together at ambient temperature. The reaction was then carried out in a similar manner to Step 1 of Example 1.

$^1$H-NMR analysis of the final product indicated that 47% of the orthoester links were connected to three PPG-moieties, 40% to two, and 13% to one moiety. No unreacted TEOF was found according to $^1$H-NMR.

Step 2

In the subsequent step, the PPG-orthoester polymer was reacted with ethylene oxide in such an amount that around 64% w/w of the final product was made up of ethyleneoxy groups. The same procedure as in Step 2 of Example 1 was followed for the ethoxylation.

The RSN value was found to be 22.7.

Example 3

One mole of triethyl orthoformate (TEOF), 0.75 moles of PPG 400, 0.60 moles of poly(ethylene glycol) monomethyl ether having an average molecular weight of 350 (MPEG 350), and 0.08% w/w (on total weight of charged mixture) of anhydrous citric acid were mixed together at ambient temperature. The mixture was heated rapidly to 125° C. and then stepwise up to 160° C. The reaction was carried out in a similar manner to Step 1 of Example 1.

The formation of the PPG-MPEG block polymer with built-in orthoester links was followed by $^1$H-NMR, which enabled quenching of the reaction at the desired degree of polymerization. No unreacted TEOF was found in the end product according to $^1$H-NMR. SEC chromatography indicated a broad molecular weight distribution with an average $M_w$ of 4,000.

The RSN value was found to be 17.1.

Example 4

One mole of triethyl orthoformate (TEOF), 0.71 moles of PPG 400, 0.11 moles of butyl diglycol (BDG, diethylene glycol monobutyl ether), and 0.11% w/w (on total weight of charged mixture) of anhydrous citric acid were mixed together at ambient temperature. The reaction was then carried out in a similar manner to Step 1 of Example 1.

The formation of the PPG-MPEG block polymer with built-in orthoester links was followed by $^1$H-NMR in the same way as in the previous Examples. No unreacted TEOF was found in the end product according to $^1$H-NMR. SEC chromatography showed a broad molecular weight distribution with an average $M_w$ of 5,400.

The RSN value was found to be 8.5.

Example 5

One mole of triethyl orthoformate (TEOF), 0.90 moles of PPG 400, 0.35 moles of a C9/11 fatty alcohol reacted with 8 moles of ethylene oxide (Berol® OX 91-8), and 0.08% w/w (on total weight of charged mixture) of anhydrous citric acid were mixed together at ambient temperature. The reaction was then carried out in a similar manner to Step 1 of Example 1.

The formation of the PPG-fatty alcohol ethoxylate block polymer with built-in orthoester links was followed by $^1$H-NMR. No unreacted TEOF was found in the end product according to $^1$H-NMR. SEC chromatography showed a broad molecular weight distribution with an average $M_w$ of 7,600.

The RSN value was found to be 9.6.

Example 6

One mole of triethyl orthoformate (TEOF), 0.96 moles of PPG 400, 0.20 moles of 2-(dimethylamino)ethanol (DMAE), and 0.22% w/w (on total weight of charged mixture) of anhydrous citric acid were mixed together at ambient temperature. The reaction was then carried out in a similar manner to Step 1 of Example 1.

The formation of the PPG-ethanolamine block polymer with built-in orthoester links was followed by $^1$H-NMR. No unreacted TEOF or DMAE was found in the end product according to $^1$H-NMR. SEC chromatography showed a broad molecular weight distribution with an average $M_w$ of 5,900.

The RSN value was found to be 9.2.

Example 7

The product of Example 6 was quaternized to yield a product containing a number of constantly positively charged sites in the following manner:

0.775 moles of the amine product of Example 6 were charged to a glass autoclave, 3 g of $NaHCO_3$ were added and mixed with the amine by agitation at 1,000 rpm.

The autoclave was purged with nitrogen three times, evacuated to 0.03 bar absolute pressure, and heated to 65° C. 0.1 mole of methyl chloride was added manually and an exothermic reaction took place accompanied by an increase in pressure from 0.04 to 1.2 bar absolute. The temperature was increased stepwise to 85° C. to drive the reaction to completion. The reaction was considered completed when a constant pressure of 0.5 bar absolute was reached. The total reaction time including post-reaction was 4.5 hours. The reactor was finally evacuated and purged with nitrogen three times before the product was taken out of the reactor.

Analysis with $^1$H- and $^{13}$C-NMR revealed that all amine functions were reacted and that corresponding quaternary ammonium compounds were formed. The orthoester links were intact.

The RSN value was found to be 9.9.

Example 8

One mole of triethyl orthoformate (TEOF), 0.75 moles of poly(tetrahydrofuran) having an average molecular weight of 650 (poly-THF 650), 0.60 moles of poly(ethyleneglycol) monomethyl ether having an average molecular weight of 350 (MPEG 350), and 0.08% w/w anhydrous citric acid were mixed together at ambient temperature. The mixture was heated rapidly to 120° C. and then stepwise up to 145° C. The gradual heating was adjusted so that the ethanol liberated during the reaction was distilled off at a suitable rate. In the following stage, a vacuum was applied to further enhance the removal of ethanol, thereby driving the reaction towards completion. The vacuum was first applied gently and then down to a lower pressure.

The formation of the poly-THF-MPEG block polymer with built-in orthoester links was monitored by $^1$H-NMR, which enabled quenching of the reaction at the desired degree of polymerization. GPC analysis indicated (by comparison with pure poly(tetrahydrofuran) standards) a broad molecular weight distribution with the centre of the distribution substantially exceeding 2,000.

The RSN value was found to be 9.7.

Example 9

One mole of TEOF, 0.63 moles of poly-THF 650, 0.62 moles of MPEG 350, and 0.07% w/w anhydrous citric acid were mixed together at ambient temperature. The reaction was then carried out in similar manner to Example 8.

The formation of the poly-THF-MPEG block polymer with built-in orthoester links was followed by $^1$H-NMR, which enabled quenching of the reaction at the desired degree of polymerization. GPC analysis in the same manner as in Example 1 indicated a broad molecular weight distribution with the centre of the distribution being close to 2,000.

The RSN value was found to be 12.2.

Example 10

Synthesis of Product 10a

Step 1

One mole of TEOF, 1.30 moles of poly-THF 650, and 0.07% w/w anhydrous citric acid were mixed together at ambient temperature. The reaction was then carried out in similar manner to Example 1. The highest pot temperature in this case was 135° C.

The formation of the (poly-THF)-polymer with built-in orthoester links was followed by $^1$H-NMR, which enabled quenching of the reaction at the desired degree of polymerization. According to $^1$H-NMR analysis of the final product, 20% of the ortho ester links were connected to three poly-THF-moieties, 42% to two, and 29% to one moiety.

GPC analysis in the same manner as in Example 8 indicated a broad molecular weight distribution with the centre of the distribution substantially exceeding 2,000.

Step 2

In the subsequent step, the (poly-THF)-orthoester polymer was reacted with ethylene oxide in such an amount that around 45% w/w of the final product consisted of poly(oxyethylene) chains. The reaction was catalyzed with c. 0.4% KOH in methanol. Care was taken to evaporate methanol and liberated water by vacuum at 70° C. during 2 hours before any ethylene oxide was fed into the reactor. The ethoxylation step was carried out at 160° C. and 4.5 bar(a).

The RSN value was found to be 12.9.

Additional products were subsequently synthesized by reacting the (poly-THF)-polymer obtained in step 1 with different amounts of ethylene oxide by the same procedure as described above. These products were characterized as follows

| | % by weight of poly(oxyethylene) chains | RSN |
|---|---|---|
| Product 10b) | 55 | 14.6 |
| Product 10c) | 65 | 16.7 |
| Product 10d) | 75 | 19.8 |

Example 11

Synthesis of Product 11a

Step 1

One mole of TEOF, 1.30 moles of poly-THF 1400, and 0.07% w/w anhydrous citric acid were mixed together at ambient temperature. The mixture was heated rapidly to 125° C. and then stepwise up to 145° C. The gradual heating was adjusted so that the ethanol liberated during the reaction was distilled off at a suitable rate. In the following stage, a vacuum was applied to further enhance the removal of ethanol, thereby driving the reaction towards completion. The vacuum was first applied gently and then down to a lower pressure.

The formation of the (poly-THF)-polymer with built-in orthoester links was monitored by $^1$H-NMR, which enabled quenching of the reaction at the desired degree of polymerization. According to $^1$H-NMR analysis of the final product, 25% of the ortho ester links were connected to three poly-THF-moieties, 44% to two, and 26% to one moiety.

GPC analysis in the same manner as in Example 8 indicated a broad molecular weight distribution with the centre of the distribution substantially exceeding 2,000.

Step 2

In the subsequent step, the (poly-THF)-orthoester polymer was reacted with ethylene oxide in such an amount that around 45% w/w of the final product consisted of poly(oxyethylene) chains. The reaction was carried out in similar manner to Step 2 of Example 10.

The RSN value was found to be 11.0.

Additional products were subsequently synthesized by reacting the (poly-THF)-polymer obtained in step 1 with different amounts of ethylene oxide by the same procedure as described above. These products were characterized as follows:

| | % by weight of poly(oxyethylene) chains | RSN |
|---|---|---|
| Product 11b) | 55 | 11.7 |
| Product 11c) | 65 | 18.8 |
| Product 11d) | 75 | 19.9 |

Performance Evaluation

Example 12

The performance of some of the demulsifiers of the present invention was evaluated by carrying out tests on emulsions of crude oil from the North Sea and synthetic North Sea water. The density of the crude was 837 kg/m$^3$.

The speed of separation and the clarity (transmission) of the water phase were assessed by a Turbiscan Lab Expert instrument (Formulaction, France), while the remaining water content in the oil phase after separation was analyzed by Karl Fisher titration. The Turbiscan instrument is an automated, vertical scan analyzer that can be used, e.g., for studying the stability of concentrated emulsions. It is equipped with a near-infrared light source and detection systems for transmission as well as light scattering (backscattering). It is possible to set the temperature of the measuring cell of the instrument between +25° C. and +60° C.

The demulsifiers are diluted with/dissolved in butyl diglycol (BDG) to facilitate dosage of small concentrations in the tests.

1. Test Procedure:
1. 4 mL synthetic sea water and 16 mL oil are pipetted into a test tube designed for use in the Turbiscan instrument. The test tube is then heated to 70° C. in a water bath.
2. The test tube is removed from the water bath and a defined volume of BDG solution containing demulsifier is immediately added to the tube. The concentration of the demulsifier in BDG is adjusted so that only a small volume of BDG solution has to be added, e.g. 50 μl to give a final concentration of 10 mg/kg (10 ppm) of demulsifier in the oil/water mixture.
3. The test tube is then instantly shaken vigorously for 60 seconds on a Heidolph Promax 2020 shaker, to emulsify its content.
4. Thereafter, the test tube is rapidly transferred to the Turbiscan instrument. The sample is kept at 60° C. and continuous scanning of the test tube for c. 10 minutes is started immediately. The output obtained from the scanning is separation of the water phase and the oil phase and transmission in the water phase.
5. Step 3 is repeated as soon as the last scan has been performed.
6. The test tube is then directly immersed in a water bath holding water of 60° C. After 3 minutes of separation a sample of c. 1 mL is withdrawn from the oil phase c. 5 mm from the oil/water interface. The withdrawn sample is analyzed for its water content by Karl Fisher titration.
7. After an additional 5 minutes (in total 8 minutes of separation) a second oil sample of c. 2 mL is withdrawn. This sample is divided in two c. 1 mL portions which are analyzed by Karl Fisher titration.

The performance of the demulsifier or demulsifier blends is given in Table 5 as three different parameters:

Sep=separation in mm as % of height of the water phase (interface defined as 50% transmission) related to the height of the water phase in a non-emulsified sample at 60° C.

Trans=integral of % transmission between 2 and 10 mm height in the test tube related to the integral of % transmission in a non-emulsified sample at 60° C.

KF=% water in oil phase according to Karl Fisher-titration. The 8-minute value is a mean value of the two portions withdrawn.

The values of these parameters are given after different separation times.

TABLE 1

| Component(s) | | Sep | | | Trans | | | KF | |
|---|---|---|---|---|---|---|---|---|---|
| Ex No (mg/kg) | Ex No (mg/kg) | 1 min | 4 m | 8 m | 1 min | 4 min | 8 min | 3 min | 8 min |
| Ex 1a) (10) | — | 91.1% | 96.6% | 97.1% | 66.9% | 72.6% | 74.5% | 0.51% | 0.27% |
| Ex 1a) (6.7) | Ex 4 (3.3) | 91.8% | 97.2% | 97.5% | 74.8% | 81.2% | 81.6% | 0.92% | 0.28% |
| Ex 1b) (10) | — | 0% | 93.5% | 95.9% | 1.3% | 80.2% | 83.1% | 1.40% | 0.44% |
| Ex 1c) (10) | — | 45.5% | 95.9% | 97.3% | 29.4% | 79.1% | 80.4% | 1.18% | 0.31% |
| Ex 1d) (10) | — | 89.2% | 94.4% | 94.3% | 72.3% | 78.2% | 79.4% | 0.97% | 0.34% |
| Ex 1e) (10) | — | 92.2% | 96.7% | 97.6% | 68.0% | 74.4% | 75.4% | 0.62% | 0.30% |
| Ex 1f) (10) | — | 84.1% | 95.1% | 96.2% | 68.5% | 74.8% | 77.5% | 0.98% | 0.42% |
| Ex 6 (5) | Ex 2 (5) | 82.2% | 86.1% | 89.3% | 65.4% | 70.1% | 71.8% | 0.48% | 0.27% |
| Ex 5 (5) | Ex 2 (5) | 89.1% | 91.2% | 94.0% | 64.2% | 69.2% | 72.6% | 0.62% | 0.28% |
| Ex 1a) (40) | | 92.6% | 97.4% | 98.2% | 79.8% | 84.6% | 86.1% | 0.72% | 0.32% |
| Ex 8 (10) | | 0% | 84.5% | 86.3% | 2.5% | 64.0% | 68.3% | 0.45% | 0.19% |
| Ex 9 (10) | | 0% | 86.1% | 91.6% | 5.0% | 67.1% | 74.8% | 0.46% | 0.18% |
| Ex 10a (10) | | 80.0% | 99.3% | 99.7% | 58.9% | 74.7% | 76.0% | 0.52% | 0.28% |
| Ex 10b (10) | | 96.2% | 100% | 100% | 81.1% | 85.9% | 86.8% | 0.65% | 0.29% |
| Ex 10c (10) | | 92.7% | 99.2% | 99.8% | 80.8% | 88.4% | 89.5% | 0.52% | 0.22% |
| Ex 10d (10) | | 91.6% | 98.1% | 99.2% | 67.2% | 73.4% | 75.2% | 0.52% | 0.30% |
| Ex 11a (10) | | 78.0% | 98.2% | 98.7% | 62.2% | 67.7% | 69.3% | 0.35% | 0.16% |
| Ex 11b (10) | | 84.9% | 97.4% | 99.2% | 66.4% | 75.0% | 76.2% | 0.26% | 0.18% |
| Ex 11c (10) | | 91.8% | 95.7% | 96.8% | 73.7% | 78.4% | 79.8% | 0.34% | 0.22% |
| Ex 11d (10) | | 95.0% | 96.7% | 96.9% | 72.9% | 76.0% | 78.2% | 0.31% | 0.21% |
| No demulsifier | | a) | a) | a) | 0 | 0.05% | 4.7% | 0.95% | 0.49% | a) The transmission does not reach 50% within 8 minutes at any height in the tube. Thus the interface cannot be defined.

Comments on Results

The data in Table 1 clearly shows that the compounds of the present invention, both as single products and in certain mixtures, are able to give a rapid separation of oil and water, a clear water phase after a short separation time, as well as low contents of residual water in the oil phase even very close to the interface.

More in detail, a high %-value in the Sep-columns is equal to good separation, 100% being equal to a non-emulsified sample. For the reference sample which was measured without addition of a demulsifier, the transmission in the water phase was too low to enable recognition of a defined interface within the timeframe of the experiment. This equals an inadequate separation.

In the same way, a high %-value in the Trans-columns equals a good quality of the water phase, 100% again being equal to a non-emulsified sample. The reference sample without the added demulsifier has a poor water quality, with only 4.7% of the transmission of a non-emulsified sample after 8 minutes.

In the KF-columns, low %-values denote a good result with little remaining water in the oil phase. It can be seen that the compounds of the present invention in many cases give a substantially lower water content than without added demulsifier.

Further, the result with 40 mg/kg (ppm) of the product of Example 1a added demonstrates a good dose-response relationship. It is essential for practical use that increased dosage (within reasonable limits) gives an improved result and does not create any undesired side effects.

Example 13

The performance of some of the demulsifiers of the present invention was evaluated by carrying out tests on a crude oil emulsion originating from the Middle East region. The crude emulsion is analyzed to contain c. 34% v/v water and to have a density of 994 kg/m$^3$.

Test Procedure:
1. Test bottles are filled with 100 mL of emulsion in each bottle.
2. Demulsifier dissolved in butyl diglycol (BDG) is added to the bottles to a concentration of 250 ppm active material.
3. The bottles are heated to 45° C. in a temperated water bath.
4. The bottles are shaken 100 times by hand.
5. The bottles are left at room temperature (22° C.) and separation between water and oil is recorded as detailed in Table 2.
6. After 18 hours, a sample of liquid corresponding to half the volume of a centrifuge tube is withdrawn from the middle height of the oil phase. The sample is diluted to 50% concentration with xylene and centrifuged at 1,500 rpm for 3 minutes.
7. The water phase and the emulsion phase in the centrifuge tube are recorded as detailed in Table 3.
8. In order to resolve the emulsion phase, one drop of "slugging compound" (10% Witconate 708 from Akzo Nobel Surfactants) is added to the test tube. The test tube is then heated to +45° C. and run in centrifuge again.
9. The water phase and the emulsion phase in the centrifuge tube are recorded as detailed in Table 4.

TABLE 2

| | Separation | | | | |
|---|---|---|---|---|---|
| | Water separation in ml | | | | |
| | 15 min | 30 min | 1 h | 2 h | 18 h |
| Ex 8 | 10 | 19 | 27 | 30 | 30 |
| Ex 3 | 5 | 8 | 13 | 19 | 33 |
| Blank | 0 | 0 | 0 | 0 | 0 |

TABLE 3

| | Oil phase quality 1 | | |
|---|---|---|---|
| | Water % | Emulsion % | Total % |
| Ex 8 | 0 | 0.2 | 0.2 |
| Ex 3 | 4 | 0 | 4 |

TABLE 4

| | Oil phase quality 2 | | |
|---|---|---|---|
| | Water % | Emulsion % | Total % |
| Ex 8 | 0 | trace | trace |
| Ex 3 | 4 | 0 | 4 |

As demonstrated in Tables 2-4, the tested products are powerful demulsifiers giving very good water separation. In addition, especially the compound of Ex 8 is a very good drying compound, giving practically no remaining water in the separated oil phase. Further, the separated water phase for Ex 8 is clear and free of oil droplets and the interface between oil and water is distinct and sharp.

Example 14

The performance of some of the demulsifiers of the present invention was further assessed by another test using the same crude emulsion as in Example 13.

The speed of separation and the clarity (transmission) of the water phase in this case were determined with a Turbiscan Lab Expert instrument (Formulaction, France).

The demulsifiers were diluted with/dissolved in butyl diglycol (BDG) to facilitate dosage of small concentrations in the tests.

Test Procedure:
1. 20 ml crude emulsion is pipetted into a test tube designed for use in the Turbiscan instrument. The test tube is then heated to +45° C. in a water bath.
2. The test tube is removed from the water bath and the demulsifier (concentration 1.467%) is immediately added in the amounts stated in Table 5.
3. The test tube is then instantly shaken vigorously for 60 seconds on a Heidolph Promax 2020 shaker.
4. Thereafter, the test tube is rapidly transferred to the Turbiscan instrument. The sample is kept at +45° C. and continuous scanning of the test tube for >4 hours is started immediately. The output obtained from the scanning is separation between the water phase and the oil phase and transmission in the water phase.

The performance of the demulsifier or demulsifier blends is given in Table 5 as two different parameters:

Sep=separation in mm as % of height of the water phase (interface defined as 50% transmission) related to the height of the water phase in a non-emulsified sample at +60° C.

Trans=integral of % transmission between 2 and 19 mm height in test tube.

The values of these parameters are given after different separation times.

TABLE 5

| Component(s) | | Sep | | | Trans | | |
|---|---|---|---|---|---|---|---|
| Ex No (μL) | Ex No (μL) | 15 min | 30 min | 4 hours | 15 min | 30 min | 4 h |
| 9 (600) | | 16.4 mm | 16.7 mm | 17.4 mm | 61.0% | 64.2% | 70.8% |
| 9 (200) | 10a (200) | 12.7 mm | 13.9 mm | 15.1 mm | 37.0% | 43.0% | 55.0% |
| No demulsifier | | 0 | 0 | 0 | 0% | 0% | 0% |

As demonstrated in Table 5, the tested product and combination are powerful demulsifiers giving very good water separation.

Example 15

The performance of some of the demulsifiers of the present invention was evaluated by carrying out tests on emulsions of crude oil from the North Sea and synthetic seawater. The density of the crude was 855 kg/m$^3$. The crude oil was analyzed to contain 11.6% water by Karl Fisher titration.

The speed of separation and the clarity (transmission) of the water phase were assessed with a Turbiscan Lab Expert instrument (Formulaction, France), while the remaining water content in the oil phase after separation was analyzed by Karl Fisher titration.

The demulsifiers were diluted with/dissolved in butyl diglycol (BDG) to facilitate dosage of small concentrations in the tests.

Test procedure:
1. 4 mL synthetic sea water and 16 mL oil is pipetted into a test tube designed for use in the Turbiscan instrument. The test tube is then heated to 45° C. in a water bath.
2. The test tube is removed from the water bath and the demulsifier is immediately added.
3. The test tube is then instantly shaken vigorously for 60 seconds on a Heidolph Promax 2020 shaker.
4. Thereafter, the test tube is rapidly transferred to the Turbiscan instrument. The sample is kept at 45° C. and continuous scanning of the test tube for c. 10 min is started immediately. The output obtained from the scanning is separation between the water phase and the oil phase and transmission in the water phase, as well as an indication of the quality of the interface.
5. Step 3 is repeated as soon as the last scan has been performed.
6. The test tube is then directly immersed in a water bath holding water of +45° C. After 3 minutes of separation a sample of c. 0.5 mL is withdrawn from the oil phase c. 5 mm from the oil/water interface. The withdrawn sample is analyzed for water content by Karl Fisher titration.
7. After an additional 5 minutes (in total 8 minutes of separation) a second oil sample of ca. 0.5 mL is withdrawn and analyzed as in step 6.

The performance of the demulsifier or demulsifier blends is given in Table 6 as three different parameters:

Sep=separation in mm as % of height of the water phase (interface defined as 50% transmission) related to the height of the water phase in a non-emulsified sample at 45° C.

Trans=integral of % transmission between 2 and 11.4 mm height in test tube related to the integral of % transmission in a non-emulsified sample at 45° C.

KF=% water in oil phase according to Karl Fisher-titration. The 8-minute value is a mean value of the two portions withdrawn.

The values of these parameters are given after different separation times.

TABLE 6

| | Component(s) | | Sep | | | Trans | | | KF | |
|---|---|---|---|---|---|---|---|---|---|---|
| Exp | Ex No (ppm) | Ex No (ppm) | 1 min | 4 min | 8 min | 1 min | 4 min | 8 min | 3 min | 8 min |
| 6-1 | 9 (5) | 11c (5) | 38.3% | 70.7% | 78.8% | 17.8% | 53.5% | 59.4% | 1.96% | 1.12% |
| 6-2 | 8 (5) | 11a (5) | 94.7%$^a$ | 105%$^a$ | 108%$^a$ | 19.2% | 25.0% | 29.3% | 2.21% | 1.30% |
| 6-3 | 9 (10) | 11a (10) | 56.4%$^b$ | 92.1%$^b$ | 94.7%$^b$ | 18.0% | 37.6% | 42.1% | 1.20% | 0.59% |
| 6-4$^c$ | 8 (5) | 11a (5) | 105% | 110% | 112% | 74.8% | 77.0% | 78.5% | 1.10% | 1.01% |
| 6-5$^c$ | 9 (5) | 11a (5) | 104% | 110% | 112% | 69.9% | 74.0% | 76.9% | 1.26% | 1.07% |
| 6-6 | 9 (5) | 11b (5) | 87.7%$^d$ | 93.0%$^d$ | 97.4%$^d$ | 25.4% | 31.7% | 35.3% | 2.44% | 1.19% |
| 6-7 | 8 (5) | 11b (5) | 90.3%$^e$ | 105%$^e$ | 109%$^e$ | 41.0% | 49.5% | 52.4% | 2.15% | 1.19% |
| 6-8$^f$ | 9 (5) | 11a (5) | 31.3% | 79.5% | 81.9% | 9.9% | 35.6% | 40.0% | 2.26% | 1.13% |

TABLE 6-continued

| | Component(s) | | | | | | | | | |
|---|---|---|---|---|---|---|---|---|---|---|
| | Ex No | Ex No | | Sep | | | Trans | | KF | |
| Exp | (ppm) | (ppm) | 1 min | 4 min | 8 min | 1 min | 4 min | 8 min | 3 min | 8 min |
| 6-9[f] | 11a (5) | 11c (5) | 59.6% | 102% | 104% | 21.4% | 46.0% | 48.3% | 2.38% | 1.24% |
| | No demulsifier[g] | | 71.8% | 96.5% | 97.8% | 63.2% | 91.4% | 93.3% | 6.70% | 6.11% |

[a]For exp. 6-2, the interface is defined at 15% transmission instead of at 50% for the separation calculation.
[b]For exp. 6-3, the interface is defined at 25% transmission instead of at 50% for the separation calculation.
[c]Experiments 6-4 and 6-5 were carried out at +55° C. instead of at 45° C.
[d]For exp. 6-6, the interface is defined at 20% transmission instead of at 50% for the separation calculation.
[e]For exp. 6-7, the interface is defined at 35% transmission instead of at 50% for the separation calculation.
[f]For exp. 6-8 and 6-9, the interface is defined at 35% transmission instead of at 50% for the separation calculation. Connate water is used instead of synthetic seawater.
[g]The values are average values from two measurements.

The data in Table 6 in summary demonstrates that the compounds of the present invention are able to give a rapid separation of oil and water and a low content of residual water in the oil phase even very close to the interface.

The crude used in this experiment separates quickly even without the addition of demulsifier; however, a significant amount of water is left emulsified in the oil phase even after 8 minutes separation. The demulsifiers demonstrate a significant performance as dryers, as demonstrated by separation values of in some cases >100% (i.e. water originally present in the oil before emulsification is also expelled from the oil phase), and in all cases they give a substantially lower water content than without added demulsifier.

Example 16a

It is a well-established fact nowadays that a reasonable biodegradability is often required by society and the authorities for man-made organic compounds used in applications where they may finally reach the environment. For certain geographical and/or application areas certain minimum levels of biodegradability are in addition stated by law.

Compounds of the present invention were tested for biodegradability in seawater according to the *OECD Guideline for Testing of Chemicals, Section 3; Degradation and Accumulation, No. 306: Biodegradability in Seawater, Closed Bottle Test*. The biodegradation was calculated as the ratio of biochemical oxygen demand (BOD) to theoretical oxygen demand (ThOD).

| Biodegradation after 28 days | |
|---|---|
| Ex 1a) | >50% |
| Ex 1d) | >20% |
| Ex 1f) | >20% |
| Ex 3 | >30% |
| Ex 5 | >30% |
| Ex 6 | >20% |
| Ex 8 | >40% |
| Ex 9 | >40% |
| Ex 10a | >30% |
| Ex 10c | >40% |

As is stated in the Introduction to Section 3 of the *OECD Test Guidelines—Biodegradation and Bioaccumulation* (2005), a result >20% is indicative of potential for (inherent) primary biodegradation in the marine environment.

Example 16b

Only one OECD test is available for testing biodegradability under marine conditions. This test (cf Example 16a) is comparable to the OECD 301 tests (fresh water conditions). As a complement to the test in Example 16a, inherent biodegradability tests with seawater and sand (or sand plus sediment) from the sea floor based on the SCAS test method (*OECD Guidelines for Testing Chemicals, Section 3: Degradation and Accumulation No 302 A, Inherent Biodegradability, Modified SCAS test*, 1981 Paris Cedex France) were carried out with the product of examples 3, 8 and 11c, respectively. The test was performed at a temperature of 20° C. SCAS units with volumes of 150 mL were used. The units contained 22 g of sand from the sea floor or 5 g of sediment covered with 12 g of sand. At the starting point of the test, approximately 140 ml of seawater spiked with 50 mg/L of the respective test substances was added to the units and aeration was started. After one week 100 ml of the sea water was withdrawn from each unit. Subsequently, another batch of seawater (100 ml) spiked with test substance was added to the seawater and sand or sand plus sediment remaining in the unit. Aeration was started anew. This procedure was repeated weekly. Supernatant drawn off was analyzed for non-purgeable organic carbon (NPOC). The NPOC values were used to follow the removal of the test substances for a few months (Table 7).

TABLE 7

| Time (days) | Removal (%) Ex 3 Sand | Removal (%) Ex 8 Sand/sediment | Removal (%) Ex 8 Sand | Removal (%) Ex 11c Sand |
|---|---|---|---|---|
| 0 | | | | |
| 7 | 3 | 61 | 79 | 95 |
| 14 | 7 | 65 | 81 | 86 |
| 28 | 9 | 89 | 70 | 77 |
| 56 | 34 | 95 | 70 | 67 |
| 77 | 69 | 95 | 73 | 69 |
| 84 | 75 | 90 | 80 | 62 |
| 98 | 83 | — | — | 77 |
| 105 | 84 | 94 | 91 | 83 |
| 112 | — | 95 | 96 | 83 |
| 119 | 86 | 95 | 99 | 79 |

The pass level in OECD 302 tests with organic carbon removal as measure is 80%.

The results in Table 7 demonstrate that the tested compounds are removed from seawater to a very high extent.

Further, a closed bottle test according to Example 16a, though slightly modified, was carried out with the product of Ex 3. In this test seawater with 50 mL water from the SCAS unit where Ex 3 was tested per litre of fresh seawater was used instead of 100% fresh seawater. The biodegradation of the product of Ex 3 was found to be 80% at day 28. The result is a very strong indication that the product of Ex 3 is mineralized (ultimately biodegraded) in seawater.

Aquatoxicity

Example 17

As previously mentioned, another important parameter to consider is that demulsifiers which could end up in the environment are not highly toxic to, e.g., water-living organisms. It is well recognized that low toxicity to algae is a good indication of a generally low aquatoxicity profile.

Compounds of the present invention were thus tested for toxicity to the marine organism *Phaeodactylum tricornutum* according to the following guidelines:
ISO 10253, 1995: Water Quality, Marine Algal Growth Inhibition Test with *Skeletonema costatum* and *Phaeodactylum tricornutum* and ECETOC, Monograph 26: *Aquatic Toxicity Testing of Sparingly Soluble, Volatile and Unstable Substances*, September 1996.

|  | EC 50-value |
|---|---|
| Example 1a) | >100 mg/L |
| Example 1f) | >100 mg/L |
| Example 3 | >100 mg/L |
| Example 4 | >100 mg/L |
| Example 6 | >100 mg/L |
| Example 8 | >100 mg/L |
| Example 10a | >100 mg/L |
| Example 11c | >100 mg/L |

The results provide a strong indication that the class of compounds of the present invention in general can be considered to have a low aquatoxicity.

The invention claimed is:

1. A demulsifier for water/oil emulsions, said demulsifier comprising at least one orthoester based polymer having the general formula

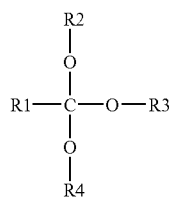

(I)

wherein R1 is hydrogen or a hydrocarbyl group with 1-4 carbon atoms, R2, R3, and R4 are, independently, a group comprising $C_3$-$C_4$ alkyleneoxy groups and/or ethyleneoxy groups in any order, and an end group Y, which is, independently, hydrogen, or a hydrocarbyl group with 1-30 carbon atoms, provided that at least one of the groups R2, R3, and R4 comprises at least one block of at least on average 4 alkyleneoxy groups with 3 and/or 4 carbon atoms, and provided that if Y is hydrogen, then at least one ethyleneoxy or alkyleneoxy group is connected to Y; or a di- or polycondensate of the polymer via free hydroxyl groups in R2, R3 or R4, wherein the polymer has an average molecular weight of from 1,500 to 40,000.

2. The demulsifier of claim 1 wherein R1 is hydrogen or a hydrocarbyl group with 1-4 carbon atoms, R2, R3, and R4 are, independently, a group -(A)n(CH$_2$CH$_2$O)$_m$Y or —(CH$_2$CH$_2$O)m(A)nY, wherein each A is, independently, an alkyleneoxy group with 3-4 carbon atoms, n and m are, on average and independently, a number of 0-100, provided that at least one of the groups R2, R3, and R4 comprises at least one block of at least on average 4 alkyleneoxy groups with 3 and/or 4 carbon atoms, and each Y is, independently,
hydrogen, a hydrocarbyl group with 1-30 carbon atoms, provided that if Y is hydrogen, then at least one of n and m is a number of 1-100, or a di- or polycondensate of the polymer via free hydroxyl groups in R2, R3 or R4.

3. The demulsifier of claim 2, characterized in that the sum of all n in the polymer is 10-1200 and at least one of the groups R2, R3, and R4 comprises at least one block with 6-20 alkyleneoxy groups with 3-4 carbon atoms.

4. The demulsifier of claim 1, characterized in that Y is, independently, H or a hydrocarbyl group with 1-4 carbon atoms.

5. The demulsifier of claim 1, characterized in that the amount of ethyleneoxy groups in the polymer is 40-85% of the total molecular weight.

6. The demulsifier of claim 1, characterized in that R1 is hydrogen, A is an alkyleneoxy group with 3 carbon atoms, and Y is hydrogen, and where the amount of ethyleneoxy groups is 50-75% by weight of the total molecular weight, the molecular weight span is 1,000400,000, and the average molecular weight is 2,000-30,000.

7. The demulsifier of claim 1, characterized in that the water/oil emulsions result from a process for the production of oil.

8. The demulsifier of claim 1, characterized in that the water/oil emulsions result from a fermentation process.

9. A process for demulsification of a water-in-oil emulsion, said process comprising adding orthoester polymer as defined in claim 1 to said water-in-oil emulsion.

10. An orthoester based polymer having the formula

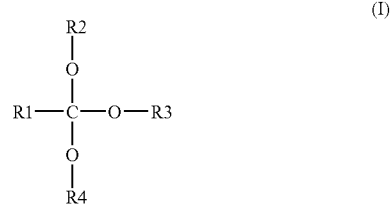

(I)

wherein R1 is hydrogen or a hydrocarbyl group with 1-4 carbon atoms, R2 is a group comprising $C_3$-$C_4$ alkyleneoxy groups and/or ethyleneoxy groups in any order, and an end group Y, which is H or a hydrocarbyl group with 1-4 carbon atoms, R4 is a group -(A)$_o$(CH$_2$CH$_2$O) pZ or —(CH$_2$CH$_2$O)p(A)$_o$Z, wherein Z is a hydrocarbyl group with 5-30 carbon atoms, each A is, independently, an alkyleneoxy group with 3-4 carbon atoms, o is a number 0-100, and p is on average a number of at least 1 and of at most 100, and R3 is selected from the group R2, R4, and a hydrocarbyl group with 1-4 carbon atoms, and provided that at least one of the groups R2, R3, and R4 comprises at least one block of at least 4 alkyleneoxy groups with 3 and/or 4 carbon atoms, or a di- or polycondensate of the polymer via free hydroxyl groups in R2 or R3, wherein the polymer has an average molecular weight of from 1,500 to 40,000.

11. A method for producing a polymer or polymer mixture as defined in claim 10, characterized in that the polymer or polymer mixture is produced in one or several steps by reacting an orthoester having the general formula

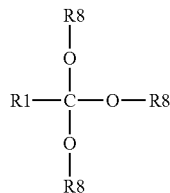
(II)

wherein R1 has the same meaning as in claim 1 and R8 is a hydrocarbyl group with 1 to 4 carbon atoms, with reactants comprising $C_3$-$C_4$ alkyleneoxy groups and/or ethyleneoxy groups in any order, an end group Y, which is H or a hydrocarbyl group with 1-4 carbon atoms, and one hydroxyl group at the other end of the molecule, $HO(A)_o(CH_2CH_2O)_pZ$, $HO(CH_2CH_2O)p(A)OZ$, wherein A, o, p, and Z have the same meaning as in claim 10, under removal of liberated hydroxyl-containing compounds of the formula R8OH.

12. A method for producing a polymer or polymer mixture as defined in claim 2, characterized in that at least one of the groups Y is H and n and m in the same substituent as said Y are a number of 1-100, wherein the polymer or polymer mixture is produced in one or several steps by reacting an orthoester having the general formula

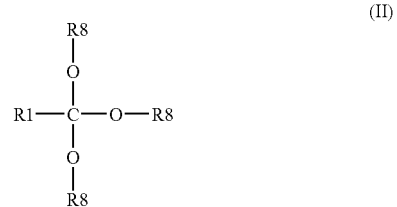

wherein R8 is a hydrocarbyl group with 1-4 carbon atoms, with a reactant having the formula $HO(A)_nY$, wherein Y is H and n is 1-100, under removal of liberated hydroxyl-containing compounds of the formula R8OH, and then reacting the obtained intermediate with Ern moles of ethylene oxide in the presence of an alkaline catalyst, or reacting an orthoester of formula (II) with a reactant having the formula $HO(CH_2CH_2O)_mY$, wherein Y is H and m is 1-100, under removal of liberated hydroxyl-containing compounds of the formula R8OH, and then reacting the obtained intermediate with Σn moles of an alkylene oxide having 3-4 carbon atoms in the presence of an alkaline catalyst.

13. A method according to claim 11 wherein the alkaline catalyst is an alkali hydroxide or an alkali metal alkoxide, preferably NaOH, KOH, $NAOCH_3$ and/or $KOCH_3$.

14. The demulsifier of claim 1 wherein the polymer has an average molecular weight of from 2,000 to 30,000.

15. The orthoester-based polymer of claim 10 wherein the polymer has an average molecular weight of from 2,000 to 30,000.

16. The process for demulsification of a water-in-oil emulsion of claim 9 wherein the polymer has an average molecular weight of from 2,000 to 30,000.

\* \* \* \* \*